United States Patent [19]

Michal et al.

[11] Patent Number: 4,875,775

[45] Date of Patent: Oct. 24, 1989

[54] RECIPROCALLY SWITCHED FOUR MODULATOR SYSTEM

[75] Inventors: Ronald J. Michal, Orange; Eric Udd, Huntington Beach; Richard F. Cahill, El Toro, all of Calif.

[73] Assignee: McDonnell Douglas Corporation, Long Beach, Calif.

[21] Appl. No.: 642,144

[22] Filed: Aug. 20, 1984

[51] Int. Cl.$^4$ .................. G01B 9/02; G01N 21/41
[52] U.S. Cl. ...................... 356/350; 73/504; 73/505; 73/657; 367/149
[58] Field of Search ............ 356/350; 73/657, 504, 73/505; 367/149

[56] References Cited

U.S. PATENT DOCUMENTS

| | | | |
|---|---|---|---|
| 4,265,541 | 5/1981 | Leclerc et al. | 356/350 |
| 4,273,444 | 6/1981 | Pool et al. | 356/350 |
| 4,299,490 | 11/1981 | Cahill et al. | 356/350 |
| 4,375,680 | 3/1983 | Cahill et al. | 367/149 |
| 4,429,573 | 2/1984 | Walker | 73/517 R |

Primary Examiner—Stephen C. Buczinski
Attorney, Agent, or Firm—Benjamin Hudson, Jr.; George W. Finch; John P. Scholl

[57] ABSTRACT

An optical instrument is provided which can be configured as a gyro, spectrometer, or other sensor of effects that can influence the transmission of light through a light conduit wherein a beam of light is split and introduced into both ends of an optical fiber which in the gyro case is a fiber-optic coil. Two fixed frequency shifters and two variable frequency shifters, one each at each end of the coil, which are switched on in alternate pairs, are used to adjust any nonreciprocal phase shift caused by rotation of the coil. The beams are mixed backed together and the resultant beam is detected and analyzed by suitable circuitry to provide an output indicative of the angular position, direction of rotation, and angular rate of the motion of the fiber-optic coil as well as any frequency bias and scale factor changes. When configured as a spectrometer, the coil is made insensitive to rotation so that changes are the result of changes in the light source.

50 Claims, 7 Drawing Sheets

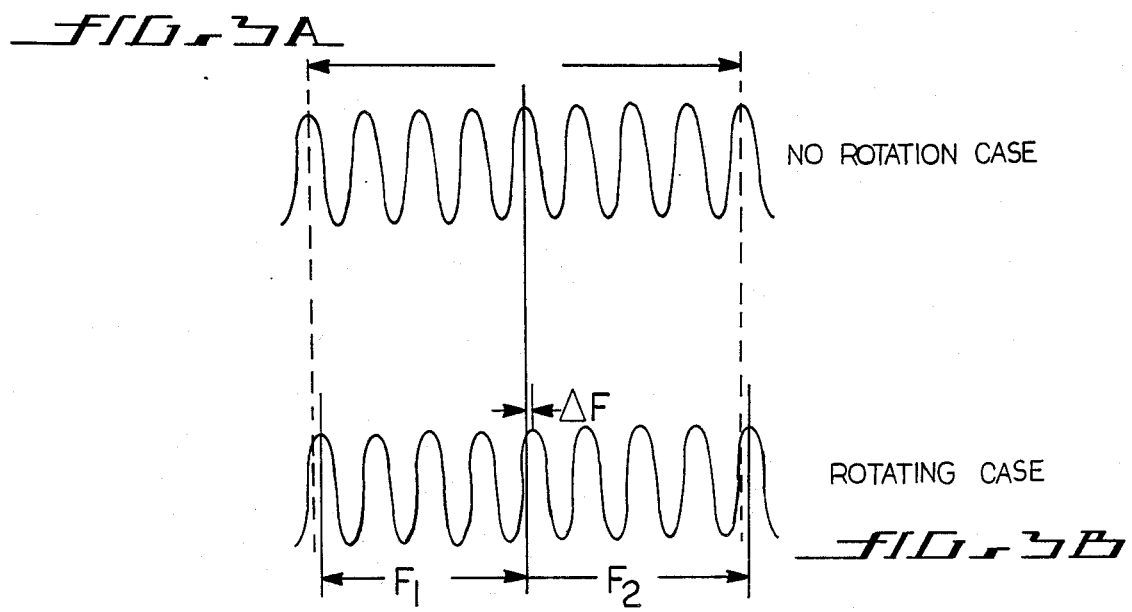
FIG. 5A
FIG. 5B
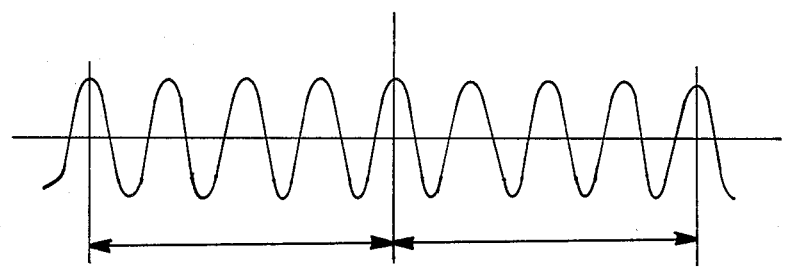
FIG. 5C

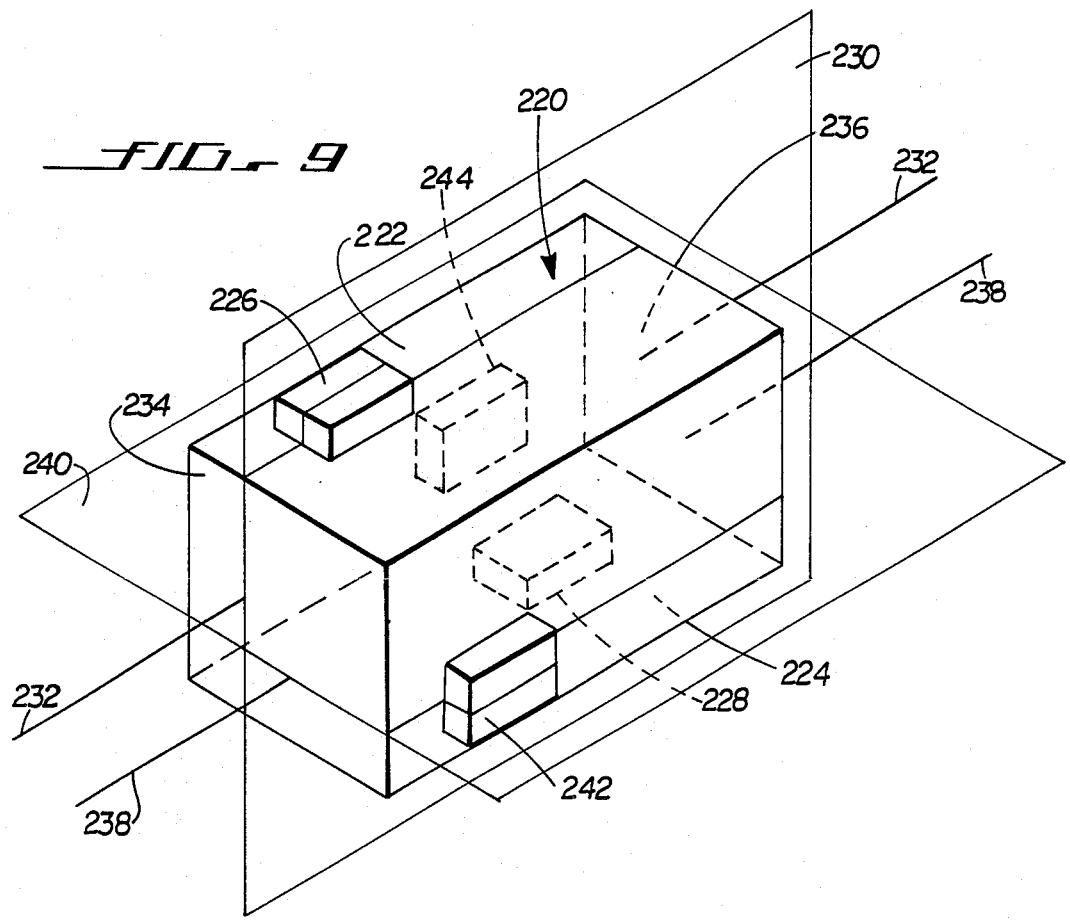
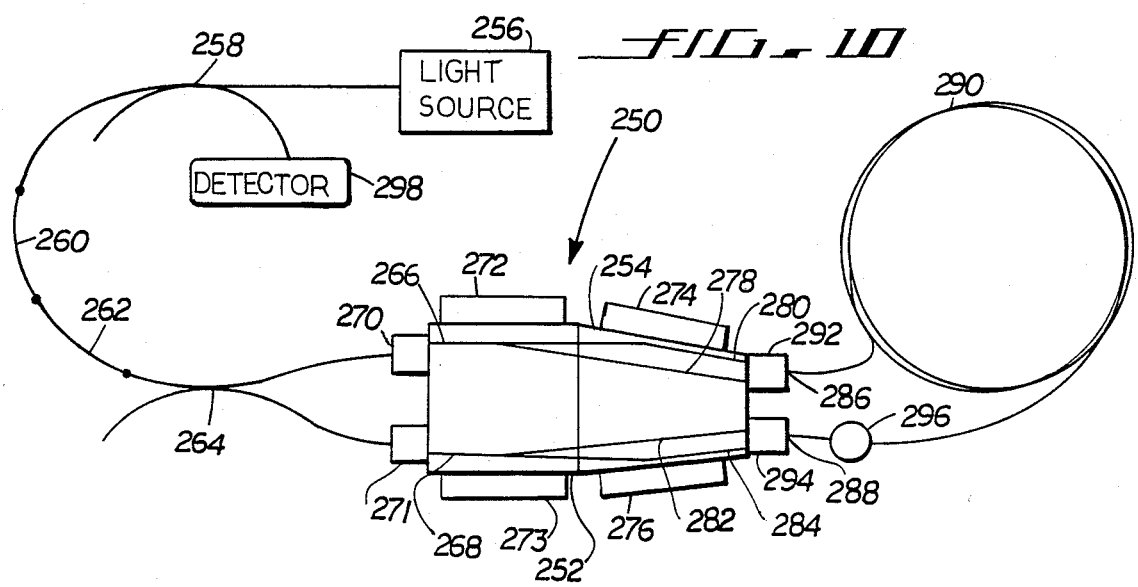

RECIPROCALLY SWITCHED FOUR MODULATOR SYSTEM

The Government has rights in this invention pursuant to Contract No. F33615-81-C-1473 awarded by the Department of the Air Force.

CROSS-REFERENCE TO RELATED PATENTS AND APPLICATIONS

This Application is related to U.S. Pat. No. 4,299,490 for "Phase Nulling Optical Gyro", U.S. Pat. No. 4,375,680 for "Optical Acoustic Sensor", U.S. patent application Ser. No. 309,254, filed Oct. 7, 1981, for "Improved Compact Optical Gyro", and U.S. patent application Ser. No. 494,956, filed May 16, 1983, for "Optical Gyro with Passive Intensity Maintenance", all by Richard F. Cahill and Eric Udd and assigned to Applicants' assignee and the Patents and Applications are incorporated by reference as though fully set forth herein below.

BACKGROUND OF THE INVENTION

Although state-of-the-art mechanical gyros and ring laser gyros are available for various applications, phase nulling fiber-optic gyros appear to have advantages over these types. These gyros have been disclosed in the article "Phase Nulling Fiber-Optic Laser Gyro", Optic Letters, Volume 4, page 93, March, 1979, by R. F. Cahill and E. Udd; "Solid-State Phase Nulling Optical Gyro" Applied Optics, Volume 19, page 3054, Sept. 15, 1980, by R. F. Cahill and E. Udd and "Techniques for Shot-Noise-Limited-Inertial Rotation Measurement Using A Multiturn Fiber Sagnac Interferometer" by J. L. Davis and S. Ezekiel published Dec. 13, 1978 in SPIE Volume 157, Laser Inertial Rotation Sensors as well as the above referenced Patents. The papers disclose early fiber-optic gyros which, although were shown to operate, had not yet been involved in the intensive development required to bring a concept to practical use. Problems inherent in ring laser gyros were bypassed by adopting passive cavity techniques and applying fiber optics. Nonlinear analog outputs of prior art fiber-optic gyros, which otherwise limit their dynamic range to a much lower level than that achieved by ring laser gyros are circumvented by using the phase nulling concept of Cahill and Udd.

The previously disclosed Cahill and Udd gyro is a linear rotation sensor rather than sinusoidal sensor. It produces an inherently digital output via a frequency change proportional to rotation rate. This gyro uses the nonreciprocal phase shift resulting from an induced frequency difference between counterpropagating beams in a fiber-optic coil to null out nonreciprocal phase shifts due to rotation. Thus it has the potential for wide dynamic range, high sensitivity and linear rotation sensing. It also has an inherently digital output desirable for modern guidance systems.

In improved forms passive fiber-optic gyros include a light source which has a wide spectral bandwidth and low coherence to avoid excess noise due to scattering. A central beamsplitter acts on the beam from the light source to generate two counterpropagating beams which are coupled into a fiber-optic coil. The counterpropagating beams exit the fiber-optic coil and are recombined by the beamsplitter. Upon rotation there is a fringe shift between the recombined beams given by Equation (1)

$$Z_R = \frac{2\Omega RL}{\lambda c} \quad (1)$$

where R is the radius of the fiber-optic coil, $\lambda$ is the wavelength, $\Omega$ is the rotation rate, L is the length of the fiber-optic coil, and c is the speed of light. The recombined beams are reflected onto a detector that monitors the fringe shift through cosinusoidal intensity changes due to the rotation. Although this device is simple, it has nonlinear analog output, limited dynamic range, and is subject to errors due to intensity fluctuations of the output of the system.

To circumvent these problems, a nonreciprocal phase shift can be introduced into the system that nulls out phase shifts due to rotation. If the light from the source is emitted at frequency $F_o$, and is split into counterpropagating beams by the central beamsplitter, the clockwise circulating beam of light passes through the fiber-optic coil at frequency $F_o$ while the counterclockwise beam circulates through the coil at frequency $F_o + F$, where F is introduced into the counterclockwise beam by a suitable frequency shifter. The relative fringe shift caused by the frequency difference of F between the two beams propagating in the fiber-optic coil is given by Equation (2)

$$Z_F = -Ft_D = -FLn/c \quad (2)$$

where $t_D$ is the time delay through the fiber coil and n is its index of refraction.

In order for the system to be nulled, the fringe shift due to rotation must be off-set by the fringe shift due to the frequency difference of the light beams counterpropagating through the fiber-optic coil. That is, the criterion for a nulled condition is stated by Equation (3)

$$Z_R + Z_F = 0 \text{ (or any integer value, when using an offset frequency)} \quad (3)$$

Combining Equations (1) and (2), results in Equation (4).

$$F = 2\Omega R/\lambda n \quad (4)$$

To assure that the nulling condition of Equation (3) holds, an AC phase-sensitive detection scheme is included. Nonreciprocal phase shifts between the counterpropagating beams are introduced at a rate $\omega$. When the condition of Equation (3) holds, second and higher order even harmonic signals appear on the detector. Upon rotation of the system, a first harmonic signal of $\omega$ falls onto the detector with an amplitude and phase dependent upon rotation rate along with higher order odd harmonics. This first harmonic signal is synchronously demodulated, and the resultant output voltage applied to an integrator, which in turn corrects the output frequency of a voltage-controlled oscillator, closing the feedback loop and nulling the system.

The performance of the gyro can be adversely affected by numerous problems such as drift which heretofore have prevented its use as an inertial grade gyro where bias drift due to wavelength shifts and nonreciprocal path lengths should be held to less than 0.1 part per million. When gyros are constructed with one frequency shifter, bias drift due to changing wavelength of the light source with age and temperature is a primary error factor. This can be corrected by employing designs using two frequency shifting modulators. With such designs, no satisfactory means are known to determine the scale factor, which depends on the instantaneous input light source frequency to approximately one part per million which is required to control an inertial grade gyro.

BRIEF DESCRIPTION OF THE PRESENT INVENTION

In the present invention, the twin problems of drift and scale factor determination in a optical instrument are solved by providing a reciprocal-switching modulation assembly which includes four frequency shifting units which may be acousto-optic (AO) modulators, two in series positioned at each end of the counterpropagating paths so that the gyro acts like two pathlength-matched gyros. The AO modulators act as frequency shifters with each series pair of modulators having their transducers located on opposite sides of the optical beam. This allows a light beam, which is input into the system at the correct Bragg angle, to be either upshifted or downshifted in frequency, depending on which modulator is being operated. At any one instant in time, only one modulator of each series pair is turned on. The modulators are turned on in pairs so as to maintain a path length match.

The system uses two independent voltage controlled oscillators and a fixed crystal oscillator. Two of the modulators, one from each operating pair, are driven by the crystal oscillator at a fixed frequency whereas each of the other modulators is connected to its associated voltage controlled oscillator. One variable frequency modulator frequency shifts the optical beam by a second fixed frequency plus the frequency needed to provide a phase shift to null out phase shifts caused by rotation. The other variable frequency modulator shifts the optical beam by the same second fixed frequency minus the frequency needed to null out the phase shift due to rotation. The gyro is operated by alternately switching frequency shifting signals to the two pairs of modulators having their transducers on the opposite sides of the beam. Each pair of modulators has one modulator that acts to frequency downshift the optical beam before entering the fiber coil and a second modulator that acts to frequency upshift the optical beam before entering the fiber coil. Therefore the two counterpropagating beams in the fiber coil have a net frequency difference that is equal to the sum of the frequency of the crystal oscillator and the frequency of the voltage controlled oscillator that is turned on. When there is no rotation, the two counterpropagating beams travel through the fiber coil and if one beam is downshifted by one of the variable frequencies, the other beam is upshifted by the fixed frequency. The two beams travel through the coil and emerge out the opposite ends. These beams then couple into the modulators again. The beam that was downshifted gets upshifted while the beam that was upshifted gets downshifted. The two beams then are recombined at the beamsplitter at the same frequency. When the gyro is rotating, the voltage controlled oscillators are adjusted in frequency to offset the associated rotationally induced phase shift. By switching between pairs of modulators, as described above, fixed bias frequencies and phase shifts due to the light source wavelength drifting are averaged out. This is done by taking the difference in frequency between the two voltage controlled oscillators in order to get the average frequency needed to null out phase shifts due to rotation. At the same time, by monitoring the change in the sum of the outputs of the two voltage controlled oscillators, the light source wavelength can be tracked to better than 1 part per million.

Inertial navigation grade gyros require performance characteristics that are at least an order of magnitude better than characteristics for a tactical grade gyro. This means that for inertial grade navigation gyros, bias drift should be no larger than 0.1 degree per hour, and the scale factor should be known to at least one part per million. This can be accomplished by using the four-modulator reciprocal-switching system of the present invention.

The main advantage of this system is both bias drift and scale factor requirements can be met at the same time. Bias drift due to fluctuations in the source wavelength are eliminated because of the symmetrical design and the switching technique used. Furthermore, fixed bias due to unequal path lengths is minimized. There is a very large frequency difference between the counterpropagating beams in the fiber coil because of the frequency upshifting/downshifting properties due to the orientation of the modulators. This causes the gyro to operate over a large number of fringes. It is this frequency difference which is used to determine wavelength and thus scale factor. The present invention has the capability to measure wavelength to better than one part in $10^8$. A single or dual modulator system will not allow for scale factor to be determined with this type of accuracy.

This invention also has the ability to act as an accurate spectrometer to measure the wavelength of an unknown light source. This is accomplished by keeping the fiber coil of the unit fixed or winding it so as to be insensitive to rotation and keeping the fiber coil at a constant temperature. Properties of the light source, such as mean wavelength change of the light source with changing temperature, may then be measured.

By holding the wavelength of the light source fixed, properties of the fiber, such as variations of the optical pathlength due to index of refraction and temperature changes, may be measured. Changing the wavelength of the source by known increments can be used to determine dispersion characteristics of the fiber.

These properties allow the invention to be a flexible tool for the characterization of light sources and fiber coils. The device also has the advantages of being small in size and low in cost when compared to conventional laboratory instrumentation.

It is therefore an object of the present invention to provide means which enable construction of an inertial grade optical gyro without extreme expense and complexity.

Another object is to provide means to reduce bias drift and enable calculation of scale factor in a fiber optic sensor.

Another object is to provide an inertial grade phase nulling optical gyro which is physically adaptable to a hardened construction for use in adverse environments.

Another object is to provide an accurate compact spectrometer to characterize light sources.

Another object is to provide a compact instrument to analyze the properties of a single mode optical fiber.

These and other objects and advantages of the present invention will become apparent to those skilled in the art after considering the following detailed specification and the accompanying drawings wherein:

BRIEF DESCRIPTION OF THE DRAWINGS

FIGS. 3A, 3B, and 3C are graphic representations of the fringe pattern produced by the gyro of FIG. 1 comparing static, rotating, and wavelength or scale factor changes;

FIG. 9 is a diagrammatic representation of a quad acousto optic modulator constructed on a single crystal block;

FIG. 10 is a diagrammatic representation of a gyro constructed employing the teachings of the present invention wherein two dual modulators are employed which, when put together, analog two of the modulators as shown in FIG. 8;

DETAILED DESCRIPTION OF THE SHOWN EMBODIMENT

Figure 1:
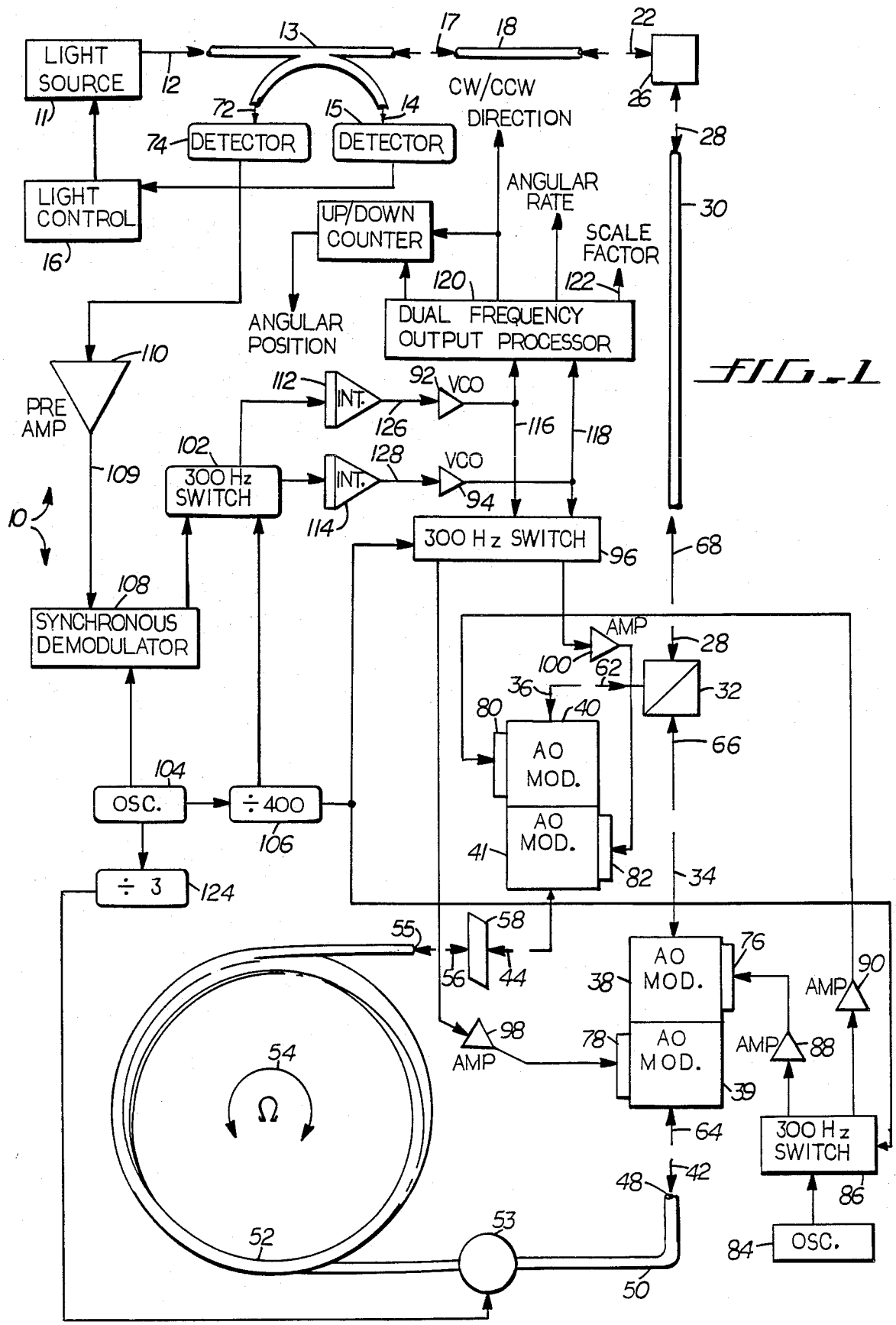
FIG. 1 is a diagrammatic representation of a typical phase nulling optical gyro including a four modulator reciprocal switching system of the present invention.
Figure 2:
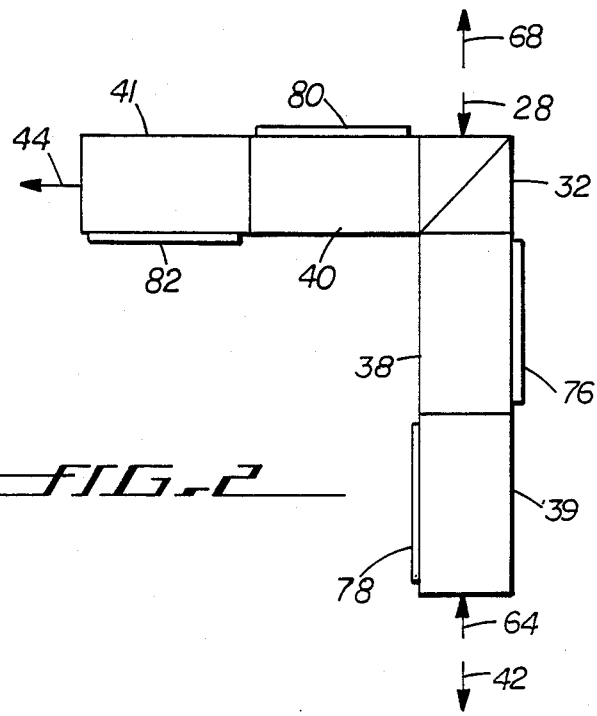
FIG. 2 is an enlarged detail view of the four-modulator reciprocal switching system shown in FIG. 1.

Referring to the drawings more particularly by reference numbers, number 10 in FIG. 1 refers to a fiber optic gyro constructed according to the present invention. The gyro 10 includes a light source 11 which preferably is a multimode or superradient diode. The light source 11 projects a multifrequency light beam 12 through a fiber optic beamsplitter 13. The fiber optic beamsplitter 13 splits the beam 12 so that a portion 14 thereof strikes an output detector 15 which is used with appropriate control 16 to maintain a constant intensity output of the light source 11. In some applications the control way also control the temperature of the light source. The other portion 17 of beam 12 is coupled into a single mode spatial filter fiber 18. The filtered beam 22 is coupled to a polarizer 26 to produce a beam 28 having a polarization of a predetermined state. The beam 28 is then directed by an optical fiber 30, present only for convenient packaging, onto a beamsplitter 32 which splits the beam 28 into a clockwise beam 34 and a counterclockwise beam 36. The beams 34 and 36 are shifted in frequency by passing through acousto-optic modulators 38 and 39, and 40 and 41 respectively to form shifted clockwise and counterclockwise beams 42 and 44 respectively. Although in FIG. 1, the acousto optic modulators 38, 39, 40, and 41 are shown separated from the beamsplitter 32 so that beams 34 and 36 can be shown, a rugged package can be constructed by connecting the beamsplitter 32 and the acousto optic modulators 38, 39, 40, and 41 into a solid block as shown in FIG. 2. The shifted clockwise beam 42 is then coupled into one end 48 of a fiber 50 forming a fiber optic coil 52. It is convenient to mount and wind the coil on a mumetal bobbin (not shown) to reduce magnetically induced effects. A length of the fiber is wound about a piezoelectric cylinder to form a fiber optic phase modulator 53. The modulator 53 is positioned near the end 48 of the fiber 50 for impressing an AC phase modulation upon the light beams 42 and 44 for demodulation purposes. The shifted clockwise beam 42 passes through the coil 52 where its phase is delayed or advanced in relation to any rotation of the coil 52 shown by the arrow 54. The clockwise beam 42 exits the other end 55 of the coil 52 as phase shifted beam 56. This phase shifted beam 56 is directed through a polarization scrambler 58, such as a rutile crystal so that the light intensity level throughout the gyro 10 is maintained, and toward the acousto optic modulators 41 and 40 where it is again frequency shifted by either acousto optic modulator 40 or 41 during passage therethrough. The beam 62 which results after shifting is directed onto the beamsplitter 32.

The shifted counterclockwise beam 44 passes out of the acousto optic modulators 40 and 41, passes through the polarization scrambler 58 and is directed into the end 55 of the fiber optic coil 52. The beam 44 is subjected to phase shifting depending upon the rotation $\Omega$ of the coil 52 and AC phase modulation by the fiber optic phase modulator 53. It exits the end 48 as beam 64 for frequency shifting by the acousto optic modulators 38 or 39 into beam 66. The beamsplitter cube 32 thereafter recombines beams 64 and 66 into a combined beam 68 which is passed back through the optical fiber 30, the polarizer 26, and the spatial filter fiber 18 to the beamsplitter 13 where it is detected as combined and polarized beam 72 by a detector 74.

As aforesaid, the twin problems of drift and scale factor determination in the gyro 10 are solved by providing the four acousto-optic modulators 38, 39, 40, and 41 and reciprocally switching them. With modulators 38 and 39, and modulators 40 and 41 in series positioned at each end of the counterpropagating paths, the gyro 10 acts like two path length matched gyros. The AO modulators 38, 39, 40, and 41 act as frequency shifters with each series pair of modulators 38 and 39, and 40 and 41 having their transducers 76, 78, 80, and 82 respectively located on opposite sides of the optical beam 42 or 44. This allows a light beam, which is input at the correct Bragg angle, either to be upshifted or downshifted in frequency for passage through the coil 52, depending on which modulator is being operated. At any one instant in time, only modulators 38 and 41, or 39 and 40 are turned on. The modulators are turned on in pairs so as to maintain a path length match. For the gyro 10 shown, modulators 38 and 39 are alternately connected to a fixed frequency oscillator 84 by a switch 86 and suitable amplifiers 88 and 90. By way of example, assume that oscillator 84 produces a fixed 80 MHz signal which is switched between the transducers 76 and 80 of the modulators 38 and 40 at 300 Hz. Two independent voltage controlled oscillators 92 and 94 are alternately connected to the transducers 78 and 82 respectively of the modulators 39 and 41 by another 300 Hz switch 96 and amplifiers 98 and 100. The switches 86 and 96 as well as a third 300 Hz switch 102 are driven together by a second fixed oscillator 104 which for example might produce an output of 120 KHz. This output is reduced in frequency to 300 Hz by a divider 106 and fed as a control signal to the switches 86, 96, and 102.

A synchronous demodulator 108 receives the 120 KHz signal from the oscillator 104 as well as the output 109 of the detector 74 suitably amplified by a preamplifier 110. The output of the synchronous demodulator 108 is switched alternately between two integrators 112 and 114 whose voltage outputs cause the voltage controlled oscillators 92 and 94 to alternately produce two signals, for example, 82 MHz plus the frequency to phase null the gyro 10 and 82 Mhz minus the frequency to phase null the gyro 10. The gyro 10 is operated by alternately switching frequency shifting signals to the modulators having their transducers on the same side of the beam. If the system is aligned so that modulators 38 and 40 frequency downshift the optical beam, then, because of the relative beam side orientation of the transducers 76, 78, 80, and 82, the other modulators 39 and 41 frequency upshift the optical beam when they are on. Therefore the two counterpropagating beams 42 and 44 in the fiber coil 52 always have a net frequency difference that is equal to the sum of the frequency of the crystal oscillator 84 and the frequency of the voltage controlled oscillator 92 or 94 that is turned on, or about ±162 MHz dependent on which pair of modulators is operating and the presence or absence of rotation.

Assuming that modulators 38 and 40 are oriented to downshift a beam from the beamsplitter 32, modulators 39 and 41 are oriented to upshift a beam from the beamsplitter 32, and modulators 38 and 41 are switched on, when there is no rotation, the two counterpropagating beams 42 and 44 travel through the fiber coil 52 with beam 42 downshifted by 80 MHz and the other beam 44 upshifted by 82 MHz. The two beams 42 and 44 travel through the coil 52, emerge out the opposite ends 48 and 55, and are recoupled into the modulators 38 and 41. The beam 42 that was downshifted 80 MHz is upshifted 82 MHz while the beam 44 that was upshifted 82 MHz gets downshifted 80 MHz. The two resultant beams 62 and 66 then are recombined at the beamsplitter 32 at the same frequency, however in the fiber coil the beams differ in frequency by 162 MHz.

The symmetrical arrangement of feeding modulators 39 and 40 on different legs of the coil 52 the same signal appears desirable, however it is not required. The gyro 10 can also be operated with the signal from the fixed frequency oscillator 84 applied to modulators 38 and 39, or 40 and 41 so long as the switching arrangement assures that in each leg one modulator is on and the other is off.

By switching between pairs of modulators, as described above, fixed bias frequencies and phase shifts due to drifting of the output 12 of the light source 11 are averaged out. This is done by taking the difference in frequency between the two voltage controlled oscillators 92 and 94 in order to get the average frequency needed to null out phase shifts due to rotation. At the same time, by monitoring the change in the sum of the outputs of the two voltage controlled oscillators 92 and 94, the wavelength of the light source 11 can be tracked to better than 1 part per million. A typical method of accomplishing this is by feeding the outputs 116 and 118 from the oscillators 92 and 94 to a dual frequency output processor 120. The processor 120 may be a microprocessor programmed to compare the difference between the signals 116 and 118 to determine and store the rotation rate and turning angle. The scale factor output 122 is produced by adding the two frequencies.

FIG. 3 illustrates this process. A series of fringes (A), (B), and (C) are shown, and the four modulator fiber optic gyro 10 of FIG. 1 operates on the outermost fringes. For example, when modulator 38 and 41 operate, nulling occurs on the right hand fringe while for 39 and 40 on the left hand fringe. When the gyro rotates, the fringes move like a comb by an amount $\Delta F$ which is the difference between the nulling frequencies (as shown between fringes (A) and (B)). When the wavelength of the light source or other scale factor change occurs, the fringes move apart (as shown between fringes (A) and (C)) or together like an accordion measurement of this change in separation, the sum of the absolute frequency differences is used to correct scale factor.

Assuming rotation of the coil 52, if the beam 34 is admitted to the acousto optic modulator 38 at frequency $F_o$ and if the acousto-optic modulator 38 adds carrier frequency $F_{c1}$ (80 MHz) to the frequency of the clockwise beam 34 and the acousto optic modulator 41 subtracts a frequency $F_{c2}$ (82 MHz)+F from the frequency $F_o$ of the counterclockwise beam 36, then the beam 42 circulating clockwise through the coil 52 passes through the coil 52 at frequency $F_o - F_{c2} - F$. The resultant beams 56 and 64 shifted by rotation of the coil 52, recombine on the beamsplitter 32 at frequency $F_o + F_{c1} - F_{c2} - F$ ($F_o + 2$ MHz$-F$) and the relative fringe shift caused by the frequency difference of F between the two counterpropagating beams through the fiber optic coil 52 is given by Equation (2) above.

In order for the system 10 to be nulled, the fringe shift detected as amplitude changes on the detector 74 must be offset by the fringe shift due to the frequency difference of the light beams 42 and 44 counterpropagating through the fiber-optic coil 52. That is, the criterion for a nulled condition as defined by Equation (3) above is satisfied. To ensure that the nulling condition of Equation (3) holds, an A/C phase sensitive detection scheme is employed. The nonreciprocal phase shifts between the beams 42 and 44 are introduced at a rate $\omega$ through the action of the phase dither element 53, which may be a piezoelectric element, a Faraday effect coil or other phase generating device and for the present example runs at 40 KHz. The element 53 is driven at 40 KHz by a divider 124 connected to divide the 120 KHz output of the oscillator 104. The element 53 is attached near one end 48 of the fiber coil 52. When the condition of Equation (3) holds, no odd harmonics of $\omega$ appears in the detector 74. Upon rotation of the coil 52, odd harmonics signal at falls onto the detector 74 with an amplitude and phase dependent upon rotation rate. Any of these odd harmonic signals may be used as the error signal to be nulled out for the determination of rotation rate and scale factor correction.

The electrical signal 109 out of the detector 74 is applied to the synchronous demodulator 108 along with a demodulating signal from the oscillator 104 whose resultant output voltage is applied alternately by the switch 102 to the integrators 112 and 114 which produce outputs 126 and 128 to correct the output frequency of the voltage controlled oscillators 92 and 94. The voltage controlled oscillators 92 and 94 produce the frequency signals 116 and 118 respectively which are fed to the output processor 120 of the system 10 which indicates the angular rate, cw/ccw direction, and angular position of the coil 52. The outputs 116 and 118 of the voltage controlled oscillators 92 and 94 are also fed to the acousto-optic modulators 39 and 40, so that nulling occurs and the fringe positions are tracked in frequency.

The use of the polarizer 26 is required to overcome output errors of the gyro 10. This technique can cause the overall signal on the detector 74 to drop below its detection threshold. This occurs because the polarizer 26 effectively selects a channel in which phase errors do not occur and discards cross polarized light. Under certain adverse conditions most of the light can be directed into the wrong mode of propagation and since this light is rejected by the polarizer 26, the signal level drops.

If polarization preserving fiber is not used to construct the coil 52, the birefringence in the fiber 50 causes changes in polarization which vary with temperature and stress. Ideal circular, straight, stress free single mode optical fibers propagate two degenerate modes and thus preserve the state of polarization of light guided in the fiber. Real circular core, single mode fiber is subject to bends, twists and other external forces which remove the degeneracy and couple energy between the two modes. Differences in the velocity with which the two modes propagate can result in phase shifts that if not compensated, can cause signal dropout. To overcome this, the light source 11 is chosen to be a broadband light source, such as a superradiant diode or a multimode laser diode. The birefringent element 58 is placed in the path of the beams 42 and 44 to establish a different polarization state for each wavelength from the diode 12. Once such a light beam 44 has passed through the element 58, it has the same spectral intensity but with scrambled polarization. One complete cycle of polarization shifting assures that signal drop out will not occur but in most instances, enough birefringency usually is provided in the element 58 to shift the polarization of the frequencies involved through many cycles. Therefore, no matter how the polarizations of the beams within the coil 52 are changed by the birefringence of the fiber 50, at least some frequencies will be present for detection.

Figure 6:
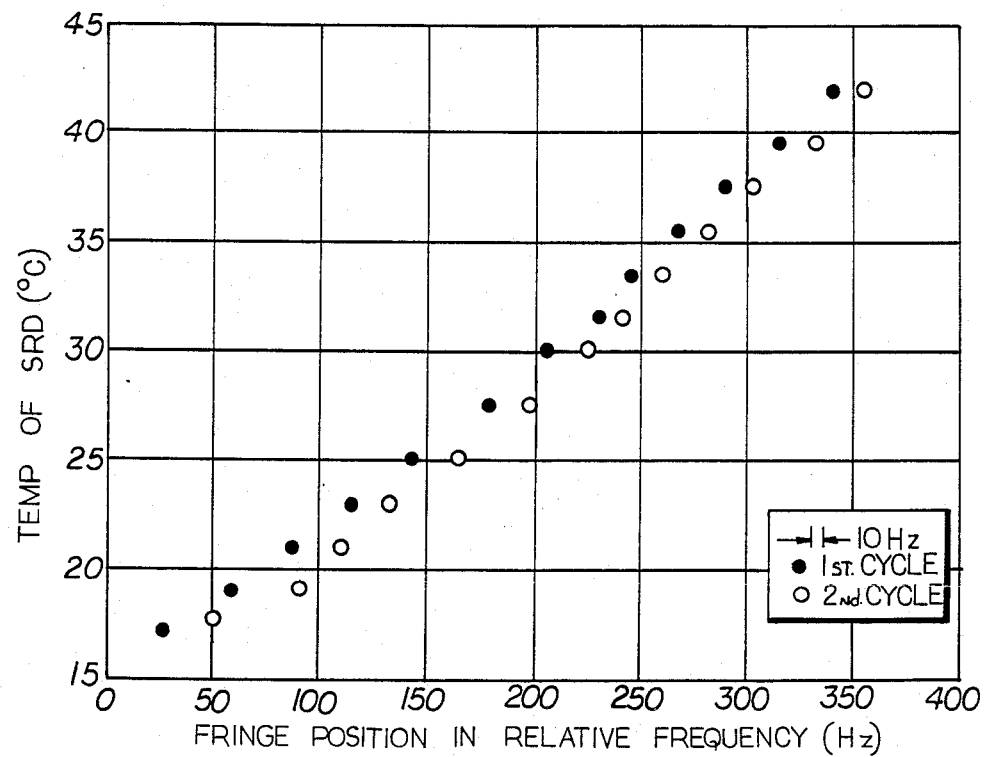
FIG. 6 is a graph of fringe position in relative frequency versus temperature of a superradient diode as measured with the four modulator reciprocal switching system operating normally.
Figure 4:
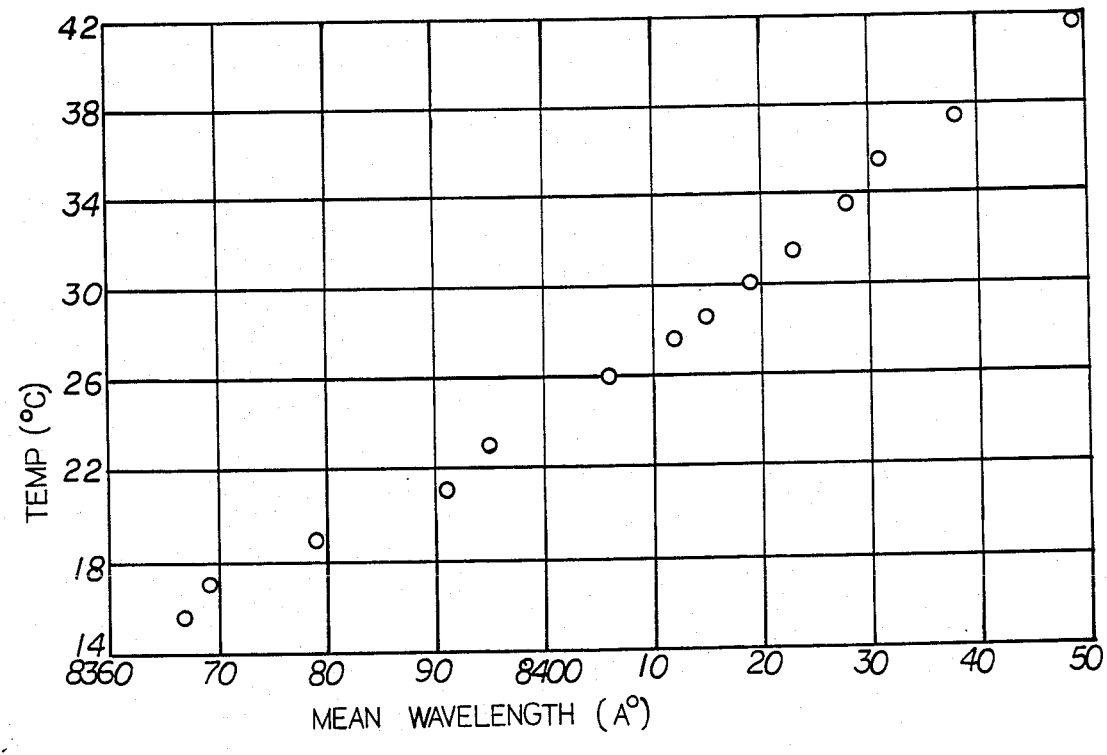
FIG. 4 is a graph of mean output wavelength versus temperature of a superradient diode as measured with a conventional spectrometer.
Figure 5:
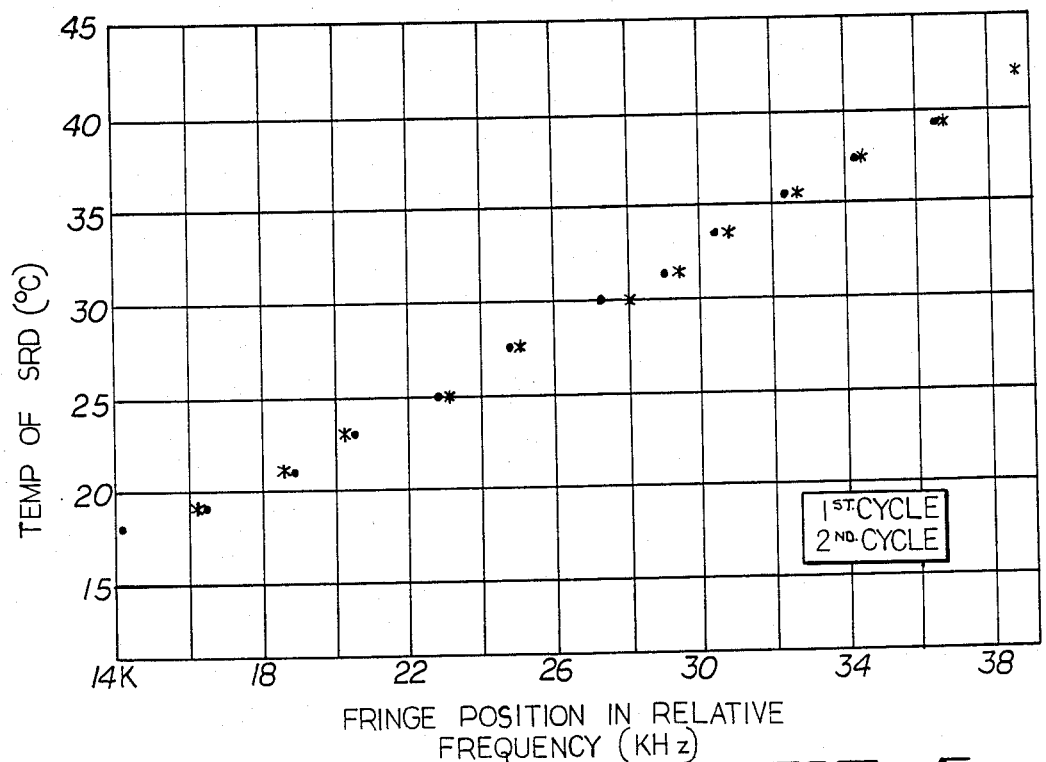
FIG. 5 is a graph of fringe position in relative frequency versus temperature of a superradient diode as measured with two modulators of the four modulator reciprocal switching system operating.

The four modulator fiber-optic gyro 10 described in association with FIG. 1 can also be used as a powerful spectrometer to perform diagnostics on light sources. This is accomplished by holding the fiber coil at a constant temperature (rotational sensitivity may be eliminated by winding the coil in a rotationally insensitive geometry, such as a figure eight) and monitoring the change in position of fringes spaced widely in frequency. FIG. 4 shows the change in wavelength of a superradiant diode with changing temperature as measured on a conventional grating spectrometer. FIG. 5 illustrates experimental data obtained measuring the difference in frequency by using dual modulators with frequency differences in the fiber coil of 2 MHz. FIG. 6 illustrates data obtained in a 162 MHz change and a four modulator configuration. The wavelength resolution of 3 ppm for this case compares well with the best conventional spectrometers. By using a common light source 11, the light control 16 can be formed by a gyro 10 configured as the above described spectrometer for applications where light source control is extremely critical.

By using a light source of known wavelength, the four modulator system may also be used to measure key parameters of single mode fiber such as the index of refraction change with temperature and pressure. Changing the wavelength of the light source a known amount also allows the dispersion of the fiber to be measured by a key parameter limiting transmission bandwidth in fiber-optic telecommunications.

The reciprocal quad acousto optic modulator switching arrangement, as described, functions as a wavelength determining spectrometer. This device when used in conjunction with a fiber-optic coil 52 wound to be insensitive to rotation 54 will determine the peak intensity wavelength of a light source in accordance with the following example. The reciprocal quad acousto optic modulator switching assembly was tested in the above described fiber optic gyro 10 for its wavelength determining ability in the following manner. To perform this test a broadband superradiant diode source 11 was heated over a temperature range of 14° to 42° C. A portion of the light coming from the fiber-optic beamsplitter 13 was directed into a Jarrel Ash spectrometer. Based on data from the Jarrel-Ash spectrometer, the graph shown in FIG. 4 was plotted showing how the peak intensity wavelength changed with temperature. The quad modulator switching assembly was used to determine the wavelength shift by monitoring the change in the sum of the outputs of the two voltage controlled oscillators as described above. Changes in the fringe position corresponded to changes in the sum of the two voltage controlled oscillators and was measured in kilohertz of frequency change. This is shown in FIG. 5. Using FIG. 4 for reference, this test was performed by having modulator 39 operate at 80 MHz and modulator 41 initially set to 82.023 MHz. The superradiant diode 11 was run at 25° C. for this setting. The temperature at which the diode 11 was run was then varied from 12° to 42° C. and the operating frequency of modulator 41 adjusted so that the fringe position remained nulled out. The average frequency change over the 23° C. temperature range was 1000 Hz per °C. Since the sensitivity of this modulator pair is about 10 Hz, the wavelength resolution of this configuration corresponds to 0.03 angstroms or 3 ppm. For comparison, the quad modulator assembly was operated to simulate a dual modulator gyro. This was accomplished by using modulators 39 and 40. For this test, modulator 39 was set to a frequency of 80 MHz, and the frequency of modulator 40 was set to 82.023289 MHz which corresponds to ten fringe displacement in the test block assembly. The position of the tenth fringe in frequency moves as a function of the wavelength change which in turn is a function of the ambient temperature of the superradiant diode 11. The results of this test is shown in FIG. 5. The frequency change is about 12.6 Hz/°C. over the range or about 5 Hz per angstrom. Since changes on the order of 2 Hz can be detected this corresponds to wavelength resolution of about 40 ppm.

From this data it has been demonstrated that the quad modulator switching assembly gives at least an order of magnitude improvement for determining wavelength over the previously disclosed dual modulator configuration. This property allows this device to be used in any system where an accurate determination of the peak intensity wavelength of a source of light is needed.

Figure 7:
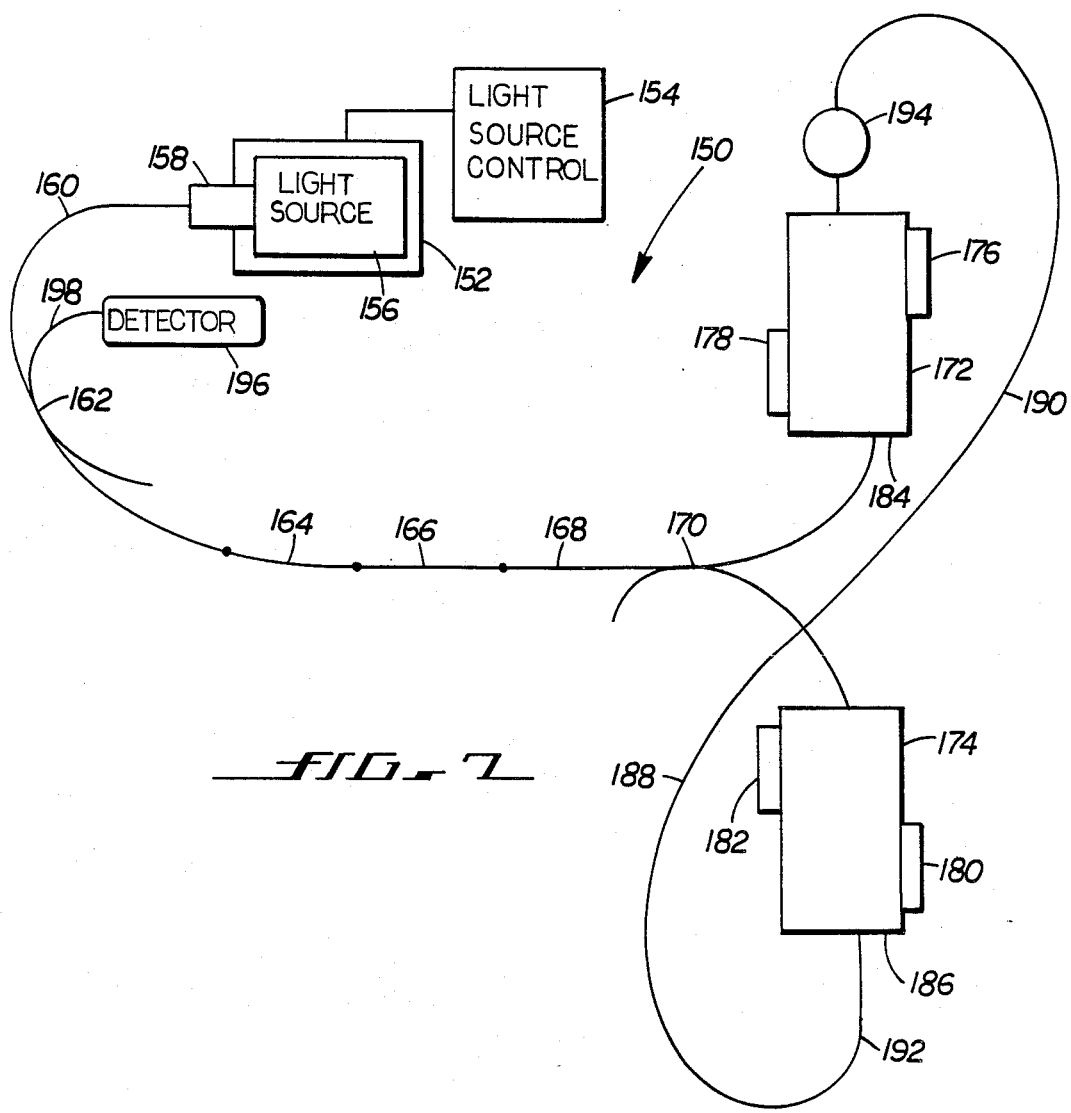
FIG. 7 is a diagrammatic representation of a typical spectrometer constructed according to the present invention.

A typical spectrometer 150 employing the teachings of the present invention is shown in FIG. 7. This spectrometer 150 includes an oven 152 regulated by a control 154 to regulate the temperature of a light source 156 positioned therein. In the normal instance, the light source 156 would be a diode whose temperature versus frequency characteristics are to be determined. Another characteristic could be the determination of the output frequency of the light source 156 versus current therethrough at various temperatures. Light from the light source 156 is focused by a lens 158 (or a pigtailed fiber end) into one end 160 of a fiber beamsplitter 162. The light then passes through a polarizing fiber 164 and a depolarizing fiber 166 to an end 168 of a second fiber beamsplitter 170 where the light is split into counterpropagating beams which pass through dual acousto-optic modulators 172 and 174 for frequency shifting as described above. The polarizing fiber 164 and a depolarizing fiber 166 are not needed when polarization preserving fiber is used throughout the spectrometer for intensity maintenance. The modulators 172 and 174 are similar to those shown in FIG. 1. However, the transducers 176 and 178 of modulator 172, and the transducers 180 and 182 of modulator 174 are positioned as pairs on opposite sides of crystalline blocks 184 and 186. The counterprppagating beams of light then pass through the coil 188 which is formed in a FIG. 8 pattern as shown so that whatever rotation the coil 188 experiences has a reverse effect on the light therein in the coil halves 190 and 192 thereof. The rotational sensitivity may also be reduced in other ways such that the rotationally sensitive area enclosed by the fiber coil 188 approaches zero. As in the gyro 10 of FIG. 1, the spectrometer 150 also includes a phase dither device 194 to aid detection.

After passing through the coil 188, the counterpropagating beams pass through the opposite modulator 174 or 172 and return by means of the beamsplitter 170, the depolarizing fiber 166, the polarizing fiber 164, and the beamsplitter 162 to the detector 196 by means of a second end 198 thereof. As described above, since everything is fixed except the frequency of the light source, the outputs on the detector 196 can be used to determine how the light source frequency varies with differing temperatures so that the light source 156 can be temperature characterized. Of course, the spectrometer 150 can also be used to characterize light sources which are supposed to be temperature stable, or whose frequency outputs are not known.

Figure 8:
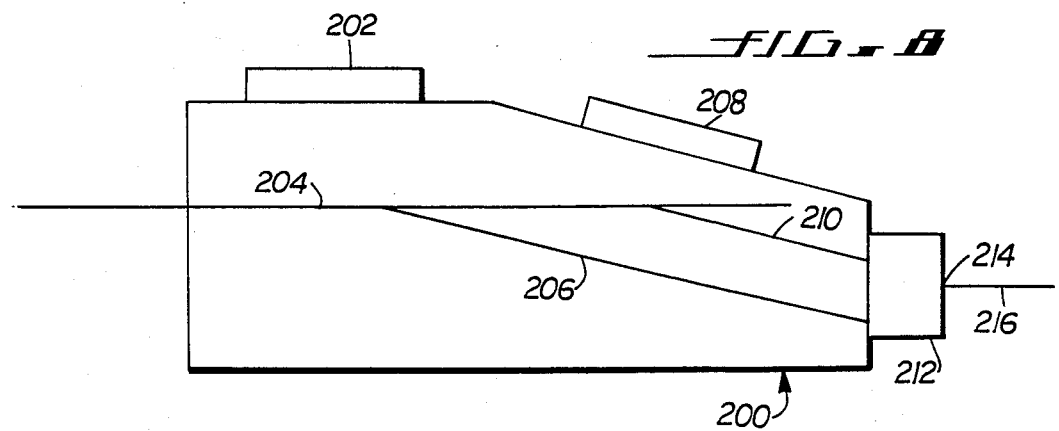
FIG. 8 is a diagrammatic view of an acousto optic modulator useful in the present invention, especially when the frequencies therein are greatly different.

The modulators 172 and 174, although shown as having parallel transducers 176 and 178, or 180 and 182 can be constructed as shown in FIG. 8. The modulator 200 of FIG. 8 includes a first portion whose transducer 202 is at the Bragg angle with respect to the light beam 204 so that when it is on, it defracts a portion thereof into the first order beam 206. By placing a second transducer 208 at the appropriate angle for the frequencies involved (the case shown is for the second transducer 208 operated at a higher frequency than the first transducer 202) the zero order beam 204 can be defracted by much differing frequencies into a beam 210 which is parallel to beam 206 and therefore can be focused by a lens 212 onto the end 214 of an optical fiber 216.

A single block 218 may be used with four transducers as shown in FIG. 9 to construct the quad acousto-optic modulator 220 shown. The modulator 220 includes the rectangular block 218 whose opposite upper and lower sides 222 and 22 have transducers 226 and 228 staggered thereon in a plane 230. A first light beam 232 is aligned with the plane 230 so that the modulators 226 and 228 are capable of frequency shifting the beam 232 in response to signals fed thereto as it passes between the ends 234 and 236 of the block 218. A second beam 238 aligned in a second plane 240 is frequency shifted by transducers 242 and 244 also in the plane 240. When the beams 132 and 138 are out of each other's plane 230 or 240, they are relatively unaffected by the opposite two transducers, since such generally have a very narrow field of operation.

A gyro 250 is shown in FIG. 10 constructed with a pair of acousto-optic modulators 252 and 254 whose operation is similar to the modulator 200 of FIG. 8. A light source 256 feeds a light beam through a fiber beamsplitter 258, a polarizing fiber 260 and a depolarizing fiber 262 to a second fiber beamsplitter 264 which splits the beam into two beams 266 and 268 and couples them through lenses 270 and 271 into the first modulator 252. The transducers 272 and 273 of the first modulator 252 and the transducers 274 and 276 of the second modulator 254 are operated in diagonal pairs as described in FIG. 1 so that beam 266 is diffracted either along the path 278 if the transducer 272 is on or the path 280 if the transducer 274 is on. The same is true with beam 268. If transducer 273 is on, then the beam follows the path 282, while if the transducer 276 is on, the beam follows path 284. Beams coming in the other direction follow the same paths, depending upon which transducer is operating. The beams 266 and 268 are focused onto the opposite ends 286 and 288 of a motion sensing coil 290 by suitable lenses 292 and 294 and a phase dither device 296 is included adjacent one end 288 of the coil 290 to assist in detection. When the beams counterpropagate in the coil 290 and then return to the detector 298 by means of the first beamsplitter 258, the interference patterns therebetween can be used as described in conjunction with FIG. 1 to determine rotation of the coil 290.

Figure 11:
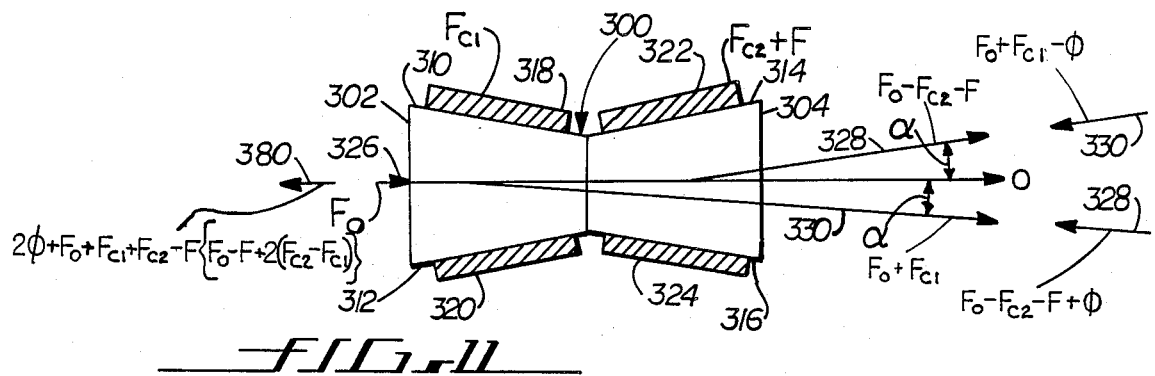
FIGS. 11 and 12 are diagrammatic views of butterfly acousto-optic modulators indicating how they can be fed signals to eliminate the need for a separate beam splitter in the present invention.
Figure 12:
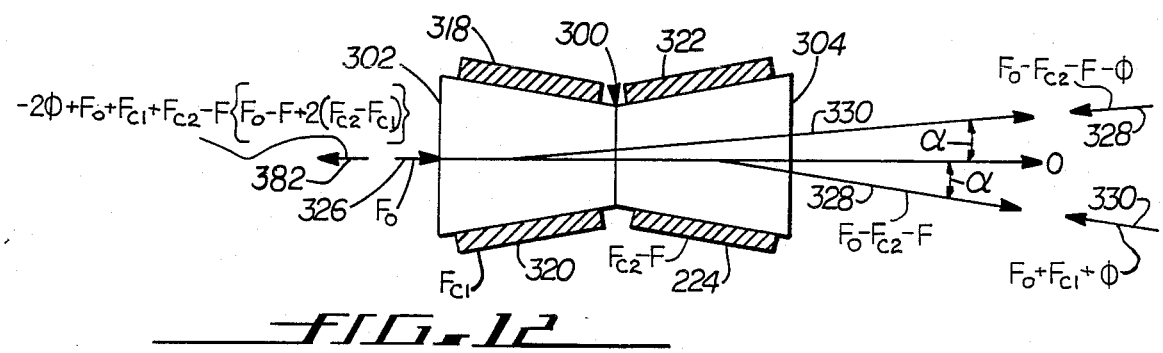
Figure 13:
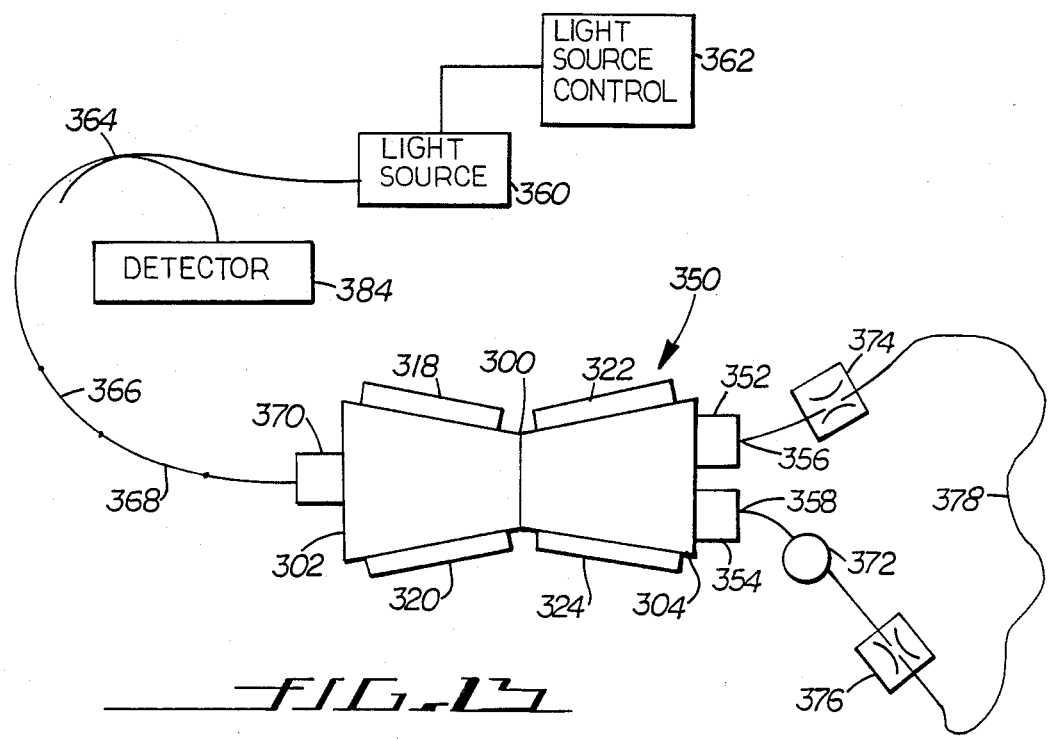
FIG. 13 is a diagrammatic representation of an instrument constructed according to the present invention arranged to characterise optical fibers and employing the modulator of FIGS. 11 and 12.

The acousto-optic modulator assembly 300 shown in FIGS. 11 and 12 can be used in the present invention to eliminate the need for a separate second beamsplitter. How it operates is illustrated in FIGS. 11 and 12. The assembly 300 is configured from two crystalline blocks 302 and 304, although a properly configured single block could be used. The blocks 302 and 304 have mating surfaces 306 and 308, and sides 310 and 312 and 314 and 316 which slope theretoward at the Bragg angle. The sides 310 and 312, and 314 and 316 have transducers 318, 320, 322 and 324 mounted thereon respectively. When the signals $F_{c1}$ and $F_{c2}+F$ are applied to the transducers 318 and 322, then the beam 326 from the light source at $F_o$ is defracted as shown into a beam 328 at a frequency $F_o-F_{c2}-F$ and a beam 330 at frequency $F_o+F_{c1}$. They extend outwardly at angles with respect to the original beam 326 when configured in a device as described above or as shown in the instrument 350 shown in FIG. 13. They are focused by suitable lenses 352 and 354 onto the ends 356 and 358 which are the opposite ends of the counter propagating light path. The ends 356 and 358 could also be optically coupled to the assembly by a single lens to which they would both be attached. The instrument 350 includes a light source 360 to produce a beam of light, the light source preferably being tightly controlled in frequency by a light source control 362, which may be as complex as the entire spectrometer shown in FIG. 7. The detector passes through a first beamsplitter 364, a polarizing fiber 366, a depolarizing fiber 368, and is focused into the beam 326 by a lens 370. As shown, the light propagation path includes a phase dither device 372 and two optical fiber connectors 374 and 376 so that an optical fiber 378 can be coupled thereto for characteristic determination. When the beams 328 and 30 counterpropagate through the light path, they return as shown with their phase modified by due to effects within the optical fiber 378 which are to be measured. In particular, the relative paths of the two beams will be modified by the dispersion characteristics of the fiber 378 and thus dispersion versus wavelength can be accurately determined. The overall change in path length of the entire fiber 378 with such effects as changing temperature and pressure may also be product of the difference between the counterpropagating beams 328 and 330 and the path length change results in a net overall phase shift. They then are recombined in the assembly 300 to produce a return beam 380 to the detector. When the frequency $F_{c1}$ and $F_{c2}-F$ are removed from the transducers 318 and 322 and applied to the transducers 320 and 324 respectively, the similar result occurs. The beams pass through the optical fiber 378 in the opposite direction as shown in FIG. 12 so that the phase shift thereof is reversed to form a signal 382. Alternately the signals 380 and 382 are returned to the detector 384 so that the output caused thereby can be operated upon as described in conjunction with FIG. 1.

Thus there has been shown and described novel means to determine the wavelength of a light source used in a fiber-optic instrument to a high accuracy and hence correct for scale factor error due to this change, provide an accurate spectrometer to characterize light sources such as laser and light emitting diodes, and provide an instrument to measure fiber parameters such as dispersion characteristics and optical path length changes of the fiber with respect to such environmental effects as temperature and pressure changes which fulfills all of the objects and advantages sought therefore. Many changes, modifications, variations and other uses and applications of the subject invention will however become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A modulator assembly for modulating first and second light beams counterpropagating in a light conduit, said assembly including:
a first frequency shifting modulator pair having:
  first and second modulators;
  a first end for receiving the first light beam; and
  a second end facing the light conduit;
a second frequency shifting modulator pair having:
  third and fourth modulators;
  a first end for receiving the second light beam; and
  a second end facing the light conduit;
first oscillator means connected to apply as the frequency shifting input a first oscillator signal alternately between said first modulator of said first frequency shifting modulator pair and said third modulator of said second frequency shifting modulator pair;
second oscillator means connected to switch a second oscillator signal as the frequency shifting input to said fourth modulator of said second frequency shifting modulator pair when said first oscillator means are applying said first oscillator signal to said first modulator of said first frequency shifting modulator pair; and
third oscillator means connected to switch a third oscillator signal as the frequency shifting input to said second modulator of said first frequency shifting modulator pair when said first oscillator means are applying said first oscillator signal to said third modulator of said second frequency shifting modulator pair.

2. The modulator assembly as defined in claim 1 wherein said first, second, third, and fourth modulators are acousto-optic modulators.

3. The modulator assembly as defined in claim 1 wherein said first, second, third, and fourth modulators are acousto-optic modulators, each having:
  first and second ends for transmitting light beams therethrough; and
  a first side having a transducer thereon, said first sides of said first and third modulators being on the opposite side of the first and second beams of light from said first sides of said second and fourth modulators.

4. The modulator assembly as defined in claim 3 wherein said first end of said first modulator forms said first end of said first frequency shifting modulator pair and said second end of said second modulator forms said second end of said first frequency shifting modulator pair and wherein said first end of said third modulator forms said first end of said second frequency shifting modulator pair and said second end of said fourth modulator forms said second end of said second frequency shifting modulator pair.

5. The modulator assembly as defined in claim 4 further including:
  a beamsplitter having first, second, and third sides, said first side receiving a third beam of light and said beamsplitter producing therefrom the first and second beams of light which emanate out of said second and third sides thereof, said second side of said beamsplitter being positioned adjacent said first end of said first frequency shifting modulator pair and said third side of said beamsplitter being positioned adjacent said first end of said second frequency shifting modulator pair.

6. The modulator assembly as defined in claim 5 wherein said beamsplitter and said first, second, third, and fourth modulators are connected in a solid block.

7. The modulator assembly as defined in claim 1 wherein said first oscillator signal is at a first frequency, said second oscillator signal is comprised of a second frequency different from the first frequency plus a third variable frequency, and said third oscillator signal is comprised of the second frequency minus the third variable frequency.

8. The modulator assembly as defined in claim 7 wherein said first, second, third, and fourth modulators are acousto-optic modulators, each having:
  first and second ends for transmitting light beams therethrough; and
  a first side having a transducer thereon, said first side of said first and third transducers being on the opposite side of the first and second beams of light from said second and fourth transducers.

9. The modulator assembly as defined in claim 8 wherein said first end of said first modulator forms said first end of said first frequency shifting modulator pair and said second end of said second modulator forms said second end of said first frequency shifting modulator pair and wherein said first end of said third modulator forms said first end of said second frequency shifting modulator pair and said second end of said fourth modulator forms said second end of said second frequency shifting modulator pair.

10. The modulator assembly as defined in claim 7 wherein said first, second, third, and fourth modulators are acousto-optic modulators, each having:
first and second ends for transmitting light beams therethrough; and
a first side having a transducer thereon, said first side of said first and second transducers being on the opposite sides of the first beam of light passing through said first and second modulators and said first side of said third and fourth transducers being on the opposite sides of the second beam of light passing through said third and fourth modulators.

11. A sensor which uses light as the operative medium therein including:
light source means for producing a first beam of light;
a first beamsplitter positioned to split said first beam of light into first and second sensor beams and to recombine said first and second sensor beams;
a light conduit having:
a first end positioned to receive said first sensor beam; and
a second end positioned to receive said second sensor beam, whereby said light conduit counterpropagates said first and second sensor beams about a common path and back to said first beamsplitter for recombination;
a modulator assembly for shifting the frequency of said first and second sensor beams counterpropagating in said light conduit, said assembly including:
a first frequency shifting modulator pair having:
first and second modulators;
a first end for receiving the first sensor beam; and
a second end facing said first end of said light conduit;
a second frequency shifting modulator pair having:
third and fourth modulators;
a first end for receiving the second sensor beam; and
a second end facing said second end of said light conduit;
first oscillator means connected to apply as the frequency shifting input a first oscillator signal alternately between said first modulator of said first frequency shifting modulator pair and said third modulator of said second frequency shifting modulator pair;
second oscillator means connected to switch a second oscillator signal produced thereby as the frequency shifting input to said fourth modulator of said second frequency shifting modulator pair when said first oscillator means are applying said first oscillator signal to said first modulator of said first frequency shifting modulator pair; and
third oscillator means connected to switch a third oscillator signal produced thereby as the frequency shifting input to said second modulator of said first frequency shifting modulator pair when said first oscillator means are applying said first oscillator signal to said third modulator of said second frequency shifting modulator pair;
phase dither means positioned in said defined common path of said first and second sensor beams to vary the phase of said first and second sensor beams; and
means to detect said recombined first and second sensor beams and to produce an output therefrom indicative of differences between said first and second sensor beams when recombined.

12. The sensor defined in claim 11 wherein said means to detect said recombined first and second sensor beams and to produce an output therefrom indicative of differences between said first and second sensor beams when recombined include:
a detector which produces a detector output in response to optical signals directed thereto; and
a second beamsplitter positioned between said light source means and said first beamsplitter to direct said first and second sensor beams as recombined to said detector.

13. The sensor defined in claim 12 wherein said means to detect said recombined first and second sensor beams and to produce an output therefrom indicative of differences between said first and second sensor beams when recombined include:
fourth oscillator means which produce fixed frequency output signals, one of which is connected to drive said phase dither means;
a synchronous demodulator connected to said detector output and to a fixed frequency output signal of said fourth oscillator means to produce therefrom an demodulator output signal which varies with said output indicative of differences between said first and second sensor beams when recombined and which is connected to said second and third oscillator means.

14. The sensor defined in claim 13 wherein said second and third oscillator means each include:
an integrator connected to receive said demodulator output signal and produce therefrom integrated demodulator output signals; and
a controllable oscillator connected to said integrated demodulator output signals to produce therefrom said output indicative of differences between said first and second sensor beams when recombined.

15. The sensor defined in claim 14 wherein said light conduit is a multiturn coil of optical fiber which causes differences between said first and second sensor beams when recombined when rotated axially so that said sensor detects axial motion thereof.

16. The sensor defined in claim 14 wherein said light conduit is a coil of optical fiber wound to be insensitive to motion thereof and said light source means include:
a light source whose mean frequency output varies with temperature; and
means to vary the temperature of said light source whereby variations in mean frequency output of said light source cause differences between said first and second sensor beams when recombined so that the changes in mean frequency output of said light source can be measured.

17. The sensor defined in claim 16 wherein said light source is a superradient diode.

18. The sensor defined in claim 14 wherein said light conduit is a length of optical fiber having characteristics whose magnitudes are unknown which cause differences between said first and second sensor beams when recombined in response to frequency changes of the first and second sensor beams and said light source means include:

a light source whose mean frequency output is controllably variable, whereby the characteristics whose magnitudes are unknown of the length of optical fiber can be measured by varying the mean frequency output of said light source known amounts.

19. The sensor defined in claim 14 wherein said means to detect said recombined first and second sensor beams and to produce an output therefrom indicative of differences between said first and second sensor beams when recombined include:
dual frequency output processor means connected to said controllable oscillators to receive from each said outputs indicative of differences between said first and second sensor beams when recombined, said dual frequency output processor means adding said outputs indicative of differences between said first and second sensor beams when recombined, to produce therefrom a scale factor output.

20. The sensor defined in claim 14 wherein said means to detect said recombined first and second sensor beams and to produce an output therefrom indicative of differences between said first and second sensor beams when recombined include:
dual frequency output processor means connected to said controllable oscillators to receive from each said outputs indicative of differences between said first and second sensor beams when recombined, said dual frequency output processor means differencing said outputs indicative of differences between said first and second sensor beams when recombined, to produce therefrom a rate signal of the sensed effect causing differences between said first and second sensor beams when recombined.

21. An instrument useful in the measurement of a predetermined effect that creates differences between first and second beams of light counterpropagating in a light conduit, said instrument including:
a modulator assembly for modulating the first and second light beams, said modulator assembly having:
first, second, third, and fourth modulator means;
a first end for receiving the first light beam; and
a second end for receiving the second light beam;
first oscillator means connected to apply a first oscillator signal alternately between said first modulator means and said third modulator means as a frequency shifting input;
second oscillator means connected to switch a second oscillator signal to said fourth modulator means as a frequency shifting input when said first oscillator means are applying said first oscillator signal to said first modulator means; and
third oscillator means connected to switch a third oscillator signal to said second modulator means as a frequency shifting input when said first oscillator means are applying said first oscillator signal to said third modulator means.

22. The instrument as defined in claim 21 wherein said first, second, third, and fourth modulator means are of the acousto-optic type each having:
a transducer to which frequency shifting inputs are connected.

23. The instrument as defined in claim 22 wherein said first and second modulator means are constructed on a first crystalline block, and said third and fourth modulator means are constructed on a second crystalline block.

24. The instrument as defined in claim 23 wherein said first crystalline block includes:
first and second generally opposite sides, said transducer of said first modulator means being positioned on said first side of said first crystalline block and said transducer of said second modulator means being positioned on said second side of said first crystalline block, and wherein said second crystalline block includes:
first and second generally opposite sides, said transducer of said third modulator means being positioned on said first side of said second crystalline block and said transducer of said fourth modulator means being positioned on said second side of said second crystalline block.

25. The instrument as defined in claim 22 further including:
a first crystalline block having:
first and second generally opposite sides, said transducer of said first modulator means being positioned on said first side of said first crystalline block and said transducer of said second modulator means being positioned on said second side of said first crystalline block;
third and fourth generally opposite sides, said transducer of said third modulator means being positioned on said third side of said first crystalline block and said transducer of said fourth modulator means being positioned on said fourth side of said first crystalline block; and
fifth and sixth generally opposite sides for passage of the first and second beams of light.

26. The instrument as defined in claim 21 wherein said first, second, third, and fourth modulators means are individual acousto-optic modulators, each having:
first and second ends for transmitting light beams therethrough; and
a first side having a transducer thereon, said first side of said first and third modulator means being on the opposite side of the first and second beams of light from said first side of said second and fourth modulator means.

27. The instrument as defined in claim 21 further including:
a first beamsplitter having first, second, and third ends, said first end receiving a third beam of light and said first beamsplitter producing therefrom the first and second beams of light which emanate out of said second and third ends thereof, said second end of said first beamsplitter being positioned adjacent said first modulator means to supply the first beam of light thereto and said third end of said first beamsplitter being positioned adjacent said second modulator means to supply the second beam of light thereto.

28. The instrument as defined in claim 27 wherein said first oscillator signal is at a first frequency, said second oscillator signal is comprised of a second frequency different from the first frequency plus a third variable frequency, and said third oscillator signal is comprised of the second frequency minus the third variable frequency.

29. The instrument as defined in claim 28 further including:
light source means for producing the third beam of light;
a light conduit having:

a first end positioned to receive the first beam of light; and a second end positioned to receive the second beam of light, whereby said light conduit counterpropagates said first and second beams of light about a common path and back to said first beamsplitter for recombination;

phase dither means positioned in said defined common path of said first and second beams of light to vary the phase of said first and second beams of light; and means to detect said recombined first and second beams of light and to produce an output therefrom indicative of differences between said first and second beams of light when recombined.

30. The instrument defined in claim 29 wherein said means to detect said recombined first and second beams of light and to produce an output therefrom indicative of differences between said first and second beams of light when recombined include:

a detector which produces a detector output in response to optical signals directed thereto; and a second beamsplitter positioned between said light source means and said first beamsplitter to direct said first and second beams of light as recombined to said detector.

31. The sensor defined in claim 30 wherein said means to detect said recombined first and second beams of light and to produce an output therefrom indicative of differences between said first and second beams of light when recombined include:

fourth oscillator means which produce fixed frequency output signals, one of which is connected to drive said phase dither means;

a synchronous demodulator connected to said detector output and to a fixed frequency output signal of said fourth oscillator means to produce therefrom an demodulator output signal which varies with said output indicative of differences between said first and second beams of light when recombined and which is connected to said second and third oscillator means.

32. The sensor defined in claim 31 wherein said second and third oscillator means each include:

an integrator connected to receive said demodulator output signal and produce therefrom integrated demodulator output signals; and a controllable oscillator connected to said integrated demodulator output signals to produce therefrom said output indicative of differences between said first and second beams of light when recombined.

33. The sensor defined in claim 32 wherein said light conduit is a multiturn coil of optical fiber which causes differences between said first and second beams of light when recombined when rotated axially so that said sensor detects axial motion thereof.

34. The sensor defined in claim 32 wherein said light conduit is a coil of optical fiber wound to be insensitive to motion thereof and said light source means include:

a light source whose mean frequency output varies with temperature; and means to vary the temperature of said light source whereby variations in mean frequency output of said light source cause differences between said first and second beams of light when recombined so that the changes in mean frequency output of said light source can be measured.

35. The sensor defined in claim 34 wherein said light source is a superradient diode.

36. The instrument defined in claim 32 wherein said light conduit is a length of optical fiber having characteristics whose magnitudes are unknown which cause differences between said first and second beams of light when recombined in response to frequency changes of the first and second beams of light and said light source means include:

a light source whose mean frequency output is controllably variable, whereby the characteristics whose magnitudes are unknown of the length of optical fiber can be measured by varying the mean frequency output of said light source known amounts.

37. The instrument defined in claim 32 wherein said means to detect said recombined first and second beams of light and to produce an output therefrom indicative of differences between said first and second beams of light when recombined include:

dual frequency output processor means connected to said controllable oscillators to receive from each said outputs indicative of differences between said first and second beams of light when recombined, said dual frequency output processor means adding said outputs indicative of differences between said first and second beams of light when recombined, to produce therefrom a scale factor output.

38. The instrument as defined in claim 21 wherein said modulator assembly splits a third beam of light into the first and second beams of light which emanate out thereof at different locations thereof.

39. The instrument as defined in claim 38 wherein said first oscillator signal is at a first frequency, said second oscillator signal is comprised of a second frequency different from the first frequency plus a third variable frequency, and said third oscillator signal is comprised of the second frequency minus the third variable frequency.

40. The instrument as defined in claim 39 further including:

light source means for producing the third beam of light;

a light conduit having:

a first end positioned to receive the first beam of light from said modulator assembly and to send the second beam of light to said modulator assembly; and a second end positioned to receive the second beam of light from said modulator assembly and to send the first beam of light to said modulator assembly, whereby said light conduit counterpropagates said first and second beams of light about a common path and back to said first beamsplitter for recombination within said modulator assembly;

phase dither means positioned in said defined common path of said first and second beams of light to vary the phase of said first and second beams of light; and means to detect said recombined first and second beams of light and to produce an output therefrom indicative of differences between said first and second beams of light when recombined.

41. The instrument defined in claim 40 wherein said means to detect said recombined first and second beams of light and to produce an output therefrom indicative of differences between said first and second beams of light when recombined include:

a detector which produces a detector output in response to optical signals directed thereto; and a beamsplitter positioned between said light source means and said modulator assembly to direct said first and second beams of light as recombined to said detector.

42. The sensor defined in claim 41 wherein said means to detect said recombined first and second beams of light and to produce an output therefrom indicative of differences between said first and second beams of light when recombined include:
   fourth oscillator means which produce fixed frequency output signals, one of which is connected to drive said phase dither means;
   a synchronous demodulator connected to said detector output and to a fixed frequency output signal of said fourth oscillator means to produce therefrom an demodulator output signal which varies with said output indicative of differences between said first and second beams of light when recombined and which is connected to said second and third oscillator means.

43. The sensor defined in claim 42 wherein said second and third oscillator means each include:
   an integrator connected to receive said demodulator output signal and produce therefrom integrated demodulator output signals; and
   a controllable oscillator connected to said integrated demodulator output signals to produce therefrom said output indicative of differences between said first and second beams of light when recombined.

44. The sensor defined in claim 43 wherein said light conduit is a multiturn coil of optical fiber which causes differences between said first and second beams of light when recombined when rotated axially so that said sensor detects axial motion thereof.

45. The sensor defined in claim 43 wherein said light conduit is a coil of optical fiber wound to be insensitive to motion thereof and said light source means include:
   a light source whose mean frequency output varies with temperature; and
   means to vary the temperature of said light source whereby variations in mean frequency output of said light source cause differences between said first and second beams of light when recombined so that the changes in mean frequency output of said light source can be measured.

46. The sensor defined in claim 45 wherein said light source is a superradient diode.

47. The instrument defined in claim 43 wherein said light conduit is a length of optical fiber having characteristics whose magnitudes are unknown which cause differences between said first and second beams of light when recombined in response to frequency changes of the first and second beams of light and said light source means include:
   a light source whose mean frequency output is controllably variable, whereby the characteristics whose magnitudes are unknown of the length of optical fiber can be measured by varying the mean frequency output of said light source known amounts.

48. The instrument defined in claim 43 wherein said means to detect said recombined first and second beams of light and to produce an output therefrom indicative of differences between said first and second beams of light when recombined include:
   dual frequency output processor means connected to said controllable oscillators to receive from each said outputs indicative of differences between said first and second beams of light when recombined, said dual frequency output processor means adding said outputs indicative of differences between said first and second beams of light when recombined, to produce therefrom a scale factor output.

49. An instrument useful in the measurement of a predetermined effect that creates differences between first and second beams of light including:
   means to produce first and second beams of light at the same frequency;
   first frequency shifting modulator means to which said first beam of light at the same frequency is fed for selective frequency shifting;
   second frequency shifting modulator means to which said first beam of light at the same frequency is fed for selective frequency shifting;
   third frequency shifting modulator means to which said second beam of light at the same frequency is fed for selective frequency shifting;
   fourth frequency shifting modulator means to which said second beam of light at the same frequency is fed for selective frequency shifting;
   first oscillator means connected to apply as the frequency shifting input a first oscillator signal alternately between said first and third frequency shifting modulator means;
   second oscillator means connected to switch a second oscillator signal as the frequency shifting input to said fourth frequency shifting modulator means when said first oscillator means are applying said first oscillator signal to said first frequency shifting modulator means;
   third oscillator means connected to switch a third oscillator signal as the frequency shifting input to said second frequency shifting modulator means when said first oscillator means are applying said first oscillator signal to said third frequency shifting modulator means; and
   means to counterpropagate said first beam of light as frequency shifted by said first and second frequency shifting modulator means and said second beam of light as frequency shifted by said third and fourth frequency shifting modulator means through a light conduit where the effect to be measured can act thereupon and to said third and fourth frequency shifting modulator means and said first and second frequency shifting modulator means respectively for additional frequency shifting thereby, whereby said additionally frequency shifted first and second beams of light are impressed with information from which the predetermined effect and scale factor of the instrument can be determined.

50. An instrument useful in the measurement of a predetermined effect that creates differences between first and second beams of light including:
   means to produce first and second beams of light at the same frequency;
   first frequency shifting modulator means to which said first beam of light at the same frequency is fed for selective frequency shifting;
   second frequency shifting modulator means to which said first beam of light at the same frequency is fed for selective frequency shifting;
   third frequency shifting modulator means to which said second beam of light at the same frequency is fed for selective frequency shifting;
   fourth frequency shifting modulator means to which said second beam of light at the same frequency is fed for selective frequency shifting;

first oscillator means connected to apply as the frequency shifting input a first oscillator signal alternately between said first and second frequency shifting modulator means;

second oscillator means connected to switch a second oscillator signal as the frequency shifting input to said third frequency shifting modulator means when said first oscillator means are applying said first oscillator signal to said first frequency shifting modulator means;

third oscillator means connected to switch a third oscillator signal as the frequency shifting input to said fourth frequency shifting modulator means when said first oscillator means are applying said first oscillator signal to said second frequency shifting modulator means; and means to counterpropagate said first beam of light as frequency shifted by said first and second frequency shifting modulator means and said second beam of light as frequency shifted by said third and fourth frequency shifting modulator means through a light conduit where the effect to be measured can act thereupon and to said third and fourth frequency shifting modulator means and said first and second frequency shifting modulator means respectively for additional frequency shifting thereby, whereby said additionally frequency shifted first and second beams of light are impressed with information from which the predetermined effect and scale factor of the instrument can be determined.

* * * * *